(12) United States Patent
Albert et al.

(10) Patent No.: US 11,528,620 B2
(45) Date of Patent: Dec. 13, 2022

(54) GENERATING AND CALIBRATING SIGNAL STRENGTH PREDICTION IN A WIRELESS NETWORK

(71) Applicant: Samsung Electronics Co., Ltd., Suwon-si (KR)

(72) Inventors: Samuel Albert, Robbinsville, NJ (US); Vishnu Vardhan Ratnam, Plano, TX (US); Yan Xin, Princeton, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/393,329

(22) Filed: Aug. 3, 2021

(65) Prior Publication Data
US 2022/0053345 A1 Feb. 17, 2022

Related U.S. Application Data

(60) Provisional application No. 63/065,796, filed on Aug. 14, 2020.

(51) Int. Cl.
*H04W 24/02* (2009.01)
*H04W 24/10* (2009.01)
(Continued)

(52) U.S. Cl.
CPC ............ *H04W 24/02* (2013.01); *H04B 17/11* (2015.01); *H04B 17/373* (2015.01); *H04W 24/10* (2013.01)

(58) Field of Classification Search
CPC ..... H04W 24/10; H04W 16/18; H04W 16/22; H04B 17/21; H04B 17/101; H04B 17/102
See application file for complete search history.

(56) References Cited

U.S. PATENT DOCUMENTS

| 10,440,503 B2 | 10/2019 | Tapia |
| 2015/0141027 A1 | 5/2015 | Tsui et al. |

(Continued)

FOREIGN PATENT DOCUMENTS

| CN | 105430664 A | 3/2016 |
| EP | 3687210 A1 | 7/2020 |
| WO | 2016072893 A1 | 5/2016 |

OTHER PUBLICATIONS

International Search Report and Written Opinion of the International Searching Authority in connection with International Application No. PCT/KR2021/010794 dated Nov. 25, 2021, 8 pages.
(Continued)

*Primary Examiner* — Kevin Kim

(57) ABSTRACT

A core network entity (CNE) can predict received signal strength values for base station (BS). In response to a triggering event, the CNE fetches information on BS configuration parameters, including at least one of: a BS class, a BS location, a BS height, an orientation of the BS, a BS antenna pattern, and topographical details surrounding the BS. The BS obtains, processes and forwards to the CNE, measurement reports created by a user equipment (UE) including a signal strength value and a location of the UE. The CNE pools the measurement reports based on the BS class and, in response to another triggering event, recalibrates signal strength prediction tools, which can predict received signal strength values from the BS to a location in a vicinity of the BSs. The CNE also pools and stores the measurement reports and corresponding BS configuration parameters, after post processing and compression.

20 Claims, 11 Drawing Sheets

(51) Int. Cl.
  *H04B 17/11* (2015.01)
  *H04B 17/373* (2015.01)

(56) References Cited

U.S. PATENT DOCUMENTS

| | | | |
|---|---|---|---|
| 2017/0238316 A1* | 8/2017 | Li | H04W 72/048 |
| | | | 370/329 |
| 2018/0249345 A1 | 8/2018 | Farkas et al. | |
| 2019/0150006 A1* | 5/2019 | Yang | H04W 24/10 |
| | | | 455/422.1 |
| 2019/0319868 A1 | 10/2019 | Svennebring et al. | |
| 2020/0053591 A1 | 2/2020 | Prasad | |
| 2020/0169895 A1 | 5/2020 | Chen et al. | |
| 2020/0236495 A1 | 7/2020 | Lee et al. | |
| 2020/0252142 A1 | 8/2020 | Bedekar | |

OTHER PUBLICATIONS

Hata, "Empirical Formula for Propagation Loss in Land Mobile Radio Services", IEEE Transactions on Vehicular Technology, vol. VT-29, No. 3, Aug. 1980, pp. 317-325.

"5G; Study on channel model for frequencies from 0.5 to 100 GHz (3GPP TR 38.901 version 16.1.0 Release 16)", ETSI TR 138 901 V16.1.0, Nov. 2020, 103 pages.

Phaiboon et al., "Mobile Path loss Prediction with Image Segmentation and Classification", 2007 International Conference on Microwave and Millimeter Wave Technology, Apr. 2007, 4 pages.

Kuno et al., "Prediction Method by Deep-Learning for Path Loss Characteristics in an Open-Square Environment", 2018 International Symposium on Antennas and Propagation (ISAP 2018), Oct. 2018, pp. 443-444.

El Hammouti et al., "A Machine Learning Approach to Predicting Coverage in Random Wireless Networks", 2018 IEEE Globecom Workshops, Dec. 2018, 6 pages.

Sotiroudis et al. "A Neural Network Approach to the Prediction of the Propagation Path-loss for Mobile Communications Systems in Urban Environments", Piers Online, vol. 3, No. 8, Jan. 2007, pp. 1175-1179.

Kim et al., "Radio Propagation Measurements and Prediction Using Three-Dimensional Ray Tracing in Urban Environments at 908 MHz and 1.9 GHz", IEEE Transactions on Vehicular Technology, vol. 48, No. 3, May 1999, pp. 931-946.

Hapsari et al., "Minimization of Drive Tests Solution in 3GPP", IEEE Communications Magazine, vol. 50, No. 6, LTE-Advanced and 4G Wireless Communications: Part 2, Jun. 2012, pp. 28-36.

Enami et al., "RAIK: Regional Analysis with Geodata and Crowdsourcing to Infer Key Performance Indicators", 2018 IEEE Wireless Communications and Networking Conference (WCNC), Apr. 2018, 6 pages.

* cited by examiner

GENERATING AND CALIBRATING SIGNAL STRENGTH PREDICTION IN A WIRELESS NETWORK

CROSS-REFERENCE TO RELATED APPLICATIONS AND CLAIM OF PRIORITY

The present application claims priority to U.S. Provisional Patent Application No. 63/065,796 filed on Aug. 14, 2020. The content of the above-identified patent document is incorporated herein by reference.

TECHNICAL FIELD

The present disclosure relates to electronic devices and methods for predicting and updating base station configuration parameters in wireless communication networks.

BACKGROUND

Configuration parameters of a Base Station (BS), including location, height, azimuth and tilt angles, and pattern of antenna array, significantly impact the coverage of the BS. Consequently, these parameters are set judiciously so that the overall coverage and throughput of the cellular network are maximized. Although the BS location, antenna pattern, and height are fixed in most cases, azimuth and tilt angles may often need to be manually reconfigured based on a network condition. Such reconfiguration tasks are susceptible to human errors and use of uncalibrated devices, leading to a mismatch between the actual configuration and the prescribed configuration stored in the centralized database. These errors may get further exacerbated by misalignment due to natural phenomena, such as heavy wind, earthquakes, and the like. Such errors can adversely impact network automation optimization applications, resulting in detrimental effects such as coverage holes, cell overshooting etc. Hence, operators need to invest significant effort to routinely re-estimate the BS parameters, especially the azimuth and tilt angles, to minimize these errors.

SUMMARY

Embodiments of the present disclosure provide methods and apparatuses for generation and calibration of a signal strength prediction in an wireless communication system.

In one embodiment, an apparatus is provided. The apparatus includes a processor and a memory. The processor is configured to: in response to a triggering event, fetch information on base station (BS) configuration parameters, the BS configuration parameters comprising at least one of: a class of a BS, a location of the BS, a height of the BS, an orientation of the BS, an antenna pattern of the BS, and topographical details surrounding the BS; obtain measurement reports created by at least one user equipment (UE), wherein the measurement reports comprise a signal strength value and a location of the at least one UE; pool the measurement reports according to the class of B S; and in response to a triggering event, periodically recalibrate one or more of a plurality of signal strength prediction tools configured to predict signal strength values for the BS. The memory is configured to pool and store, from a plurality of BSs, the measurement reports and corresponding BS configuration parameters, after post processing and compression.

In another embodiment, a method is provided. The method includes in response to a triggering event, fetching information on base station (BS) configuration parameters, the BS configuration parameters comprising at least one of: a class of a BS, a location of the BS, a height of the BS, an orientation of the BS, an antenna pattern of the BS, and topographical details surrounding the BS. The method also includes obtaining measurement reports created by at least one user equipment (UE), wherein the measurement reports comprise a signal strength value and a location of the at least one UE. The method also includes pooling the measurement reports according to the class of BS. The method also includes in response to a triggering event, periodically recalibrating one or more of a plurality of signal strength prediction tools, the plurality of signal strength prediction tools capable of predicting received signal strength values from the BS to a plurality of locations in a vicinity of the BSs. The method further includes pooling and storing, in a memory, from a plurality of BSs, the measurement reports and corresponding BS configuration parameters, after post processing and compression.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
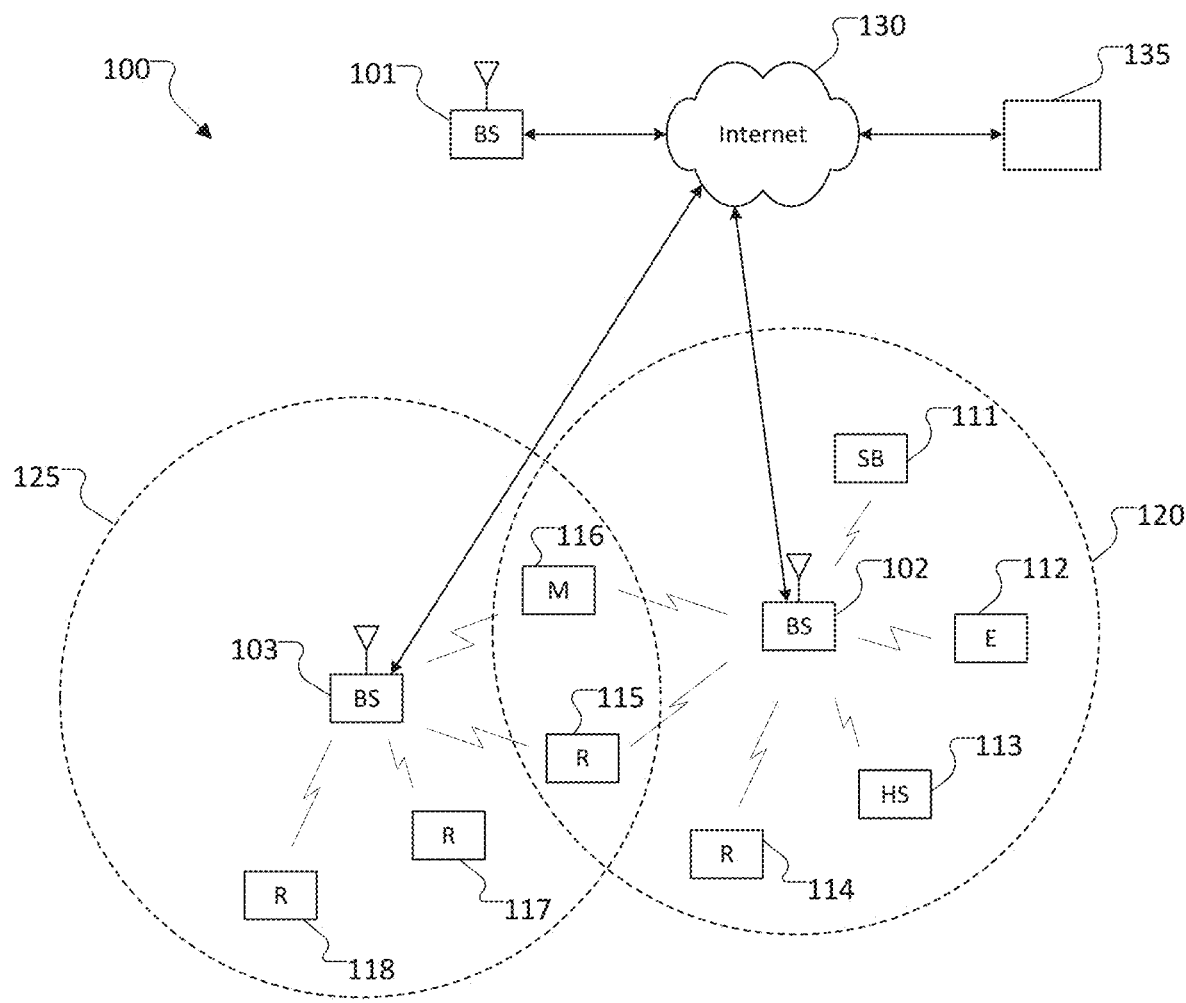
FIG. 1 illustrates an example wireless network according to embodiments of the present disclosure.

FIG. 1 through FIG. 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

Current mechanisms for updating or correcting the base station (BS) parameters involve identifying poorly performing cells using tertiary metrics and deploying a site engineer to go diagnose the reason for poor performance. Since the causes for poor performance can by many, this approach can lead to a large number of false positives. Additionally, deploying a site engineer to diagnose errors is a time consuming and expensive endeavor and is not a scalable solution for a nation-wide network with hundreds of thousands of BSs.

A requirement for such network planning and management is a signal strength or coverage prediction tool that, for a given set of BS parameters, can predict the signal strength, coverage and/or throughput in the coverage area of the BS. The signal strength or coverage prediction tool is utilized to perform site selection for BS deployment; and for reconfiguring network parameters, such as BS antenna, tilt, and the like. Apart from planning and management, such a prediction tool can also be used to estimate and correct misaligned BS parameters, a task often referred to as site audit correction. The signal strength or coverage prediction tools often require tuning to fit desired scenarios, motivating a need for an automated collection of data for tuning. It can be difficult and expensive to obtain the topographic information required for ray tracing tools.

There are several ways to do BS signal strength/coverage prediction. The first approach is to use a pre-determined statistical channel model, for example, a Hata model, a 3GPP channel model, (see FIG. 6), and the like. An advantage of such statistical models is that they require minimal inputs for the signal strength prediction. However, such statistical channel models are not accurate since they are not calibrated for each specific type of BS and surrounding clutter. Furthermore, such statistical channel models are not resilient to errors in the data used for training the models. Another approach for signal strength prediction is to use ray-tracing data. With ray-tracing data, the details on AoA, AoD, ZoA, ZoD, power for each ray/path between transmitter and receiver can be captured. Therefore, ray-tracing technique can be quite accurate in predicting the coverage of wireless communication networks. However, acquiring the required input data to perform raytracing may be very financially expensive. For example, the 3D maps required for ray-tracing for just one 500 m×500 m region can be cost intensive. Apart from cost, such maps may be unavailable for many regions globally. Furthermore, raytracing involves several auxiliary parameters, such reflection coefficients, penetration loss etc., and the prediction performance is good only when these parameters are appropriately set. Significant time and money are usually spent to perform drive tests for each site to calibrate these raytracing parameters. Finally, ray-tracing based coverage prediction can be very computationally intensive and time-consuming. Thus, relying solely on raytracing for signal strength prediction is not a feasible solution, especially for a service provider with a nation-wide network.

To address this issue, embodiments of the present disclosure provide methods to calibrate various signal strength prediction tools periodically with minimal effort and cost. Certain embodiments of the present disclosure also provide signal strength prediction methods using machine learning that require minimal side information and are robust to data anomalies. The discloses embodiments offer an almost entirely data driven approach to modeling the distribution of reference signal received power (RSRP) in the neighborhood of a BS. Certain embodiments of the present disclosure use very general probabilistic models for RSRP in the vicinity of the BS, which do not require a priori assumptions regarding the functional form for RSRP, although some specific functional form may be presupposed in any specific implementation. Additionally, in certain embodiments, the uncertainty associated with RSRP measurements is treated endogenously as a fundamental construct in the model. As such, embodiments of the present disclosure provide mechanisms methods to collect and manage data from users and a BS to train a signal strength prediction tool. In addition, we also propose several novel signal strength prediction methods using machine learning that obtains measured RSRP values and locations of users from base stations for which some of the configuration parameters affecting RSRP are known. The proposed methods to build a predication model for RSRP that does not require modeling of underlying physics and can avoid a need for detailed three-dimensional (3D) maps, BS antenna pattern details, and the like. Certain embodiments of the present disclosure provide multiple modes of operation depending upon a level of detail provided in the collected data.

In the following, for brevity, both Frequency Division Duplexing (FDD) and Time Division Duplexing (TDD) are considered as the duplex method for both DL and UL signaling.

Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM).

The present disclosure covers several components which can be used in conjunction or in combination with one another or can operate as standalone schemes.

To meet the demand for wireless data traffic having increased since deployment of 4G communication systems, efforts have been made to develop an improved 5G or pre-5G communication system, as well as non-terrestrial networks (NTN). Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying (FSK) and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

The following documents are hereby incorporated by reference into the present disclosure as if fully set forth herein: Hata, M. "Empirical Formula for Propagation Loss in Land Mobile Radio Services". IEEE Transactions on Vehicular Technology. VT-29 (3): 317-25, August 1980; 3GPP, TR 38.901, study on channel model for frequencies from 0.5 to 100 GHz; S. Phaiboon, P. Phokharatkul and P. Kittithamavongs, "Mobile Path Loss Prediction with Image Segmentation and Classification," 2007 International Conference on Microwave and Millimeter Wave Technology, Builin, 2007, pp. 1-4; N. Kuno and Y. Takatori, "Prediction Method by Deep-Learning for Path Loss Characteristics in an Open-Square Environment," 2018 International Symposium on Antennas and Propagation (ISAP), Busan, Korea (South), 2018, pp. 1-2; Hajar El Hammouti etc, A Machine Learning Approach to Predicting Coverage in Random Wireless Networks, http://eprints.whiterose.ac.uk/136499/1/1570476364.pdf; S. P. Sotiroudis, K. Siakavara, and J. N. Sahalos Austin, M. and Stuber, "A Neural Network Approach to the Prediction of the Propagation Path-loss for Mobile Communications Systems in Urban Environments"; Seong-Cheol Kim et al., "Radio propagation measurements and prediction using three-dimensional ray tracing in urban environments at 908 MHz and 1.9 GHz," in IEEE Transactions on Vehicular Technology, vol. 48, no. 3, pp. 931-946, May 1999; W. A. Hapsari, A. Umesh, M. Iwamura, M. Tomala, B. Gyula and B. Sebire, "Minimization of drive tests solution in 3GPP," in IEEE Communications Magazine, vol. 50, no. 6, pp. 28-36, June 2012, doi: 10.1109/MCOM.2012.6211483; and R. Enami, D. Rajan and J. Camp, "RAIK: Regional analysis with geodata and crowd-sourcing to infer key performance indicators," 2018 IEEE Wireless Communications and Networking Conference (WCNC), Barcelona, 2018, pp. 1-6, doi: 10.1109/WCNC.2018.8377405.

Figure 2:
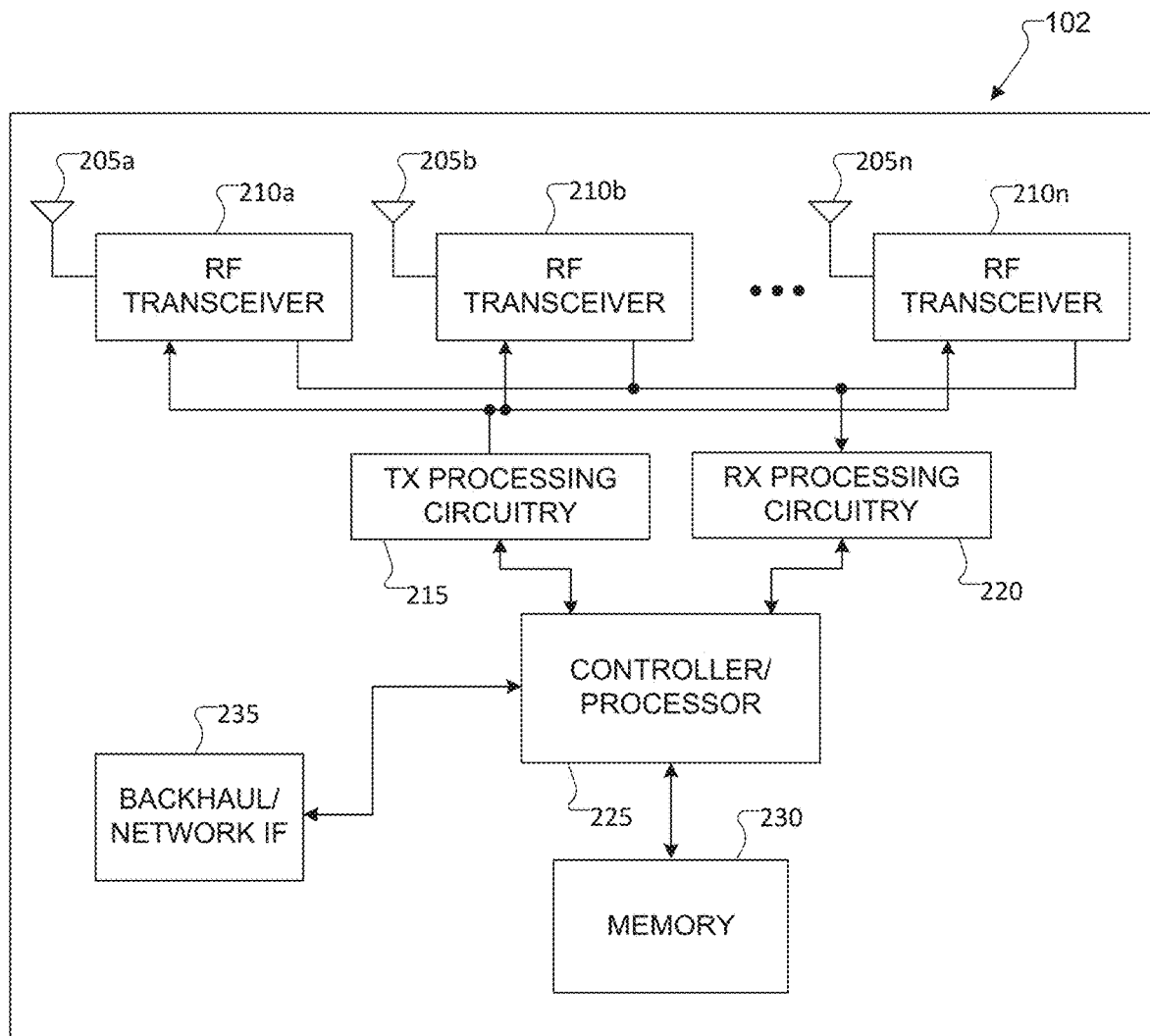
FIG. 2 illustrates an example gNB according to embodiments of the present disclosure.
Figure 3:
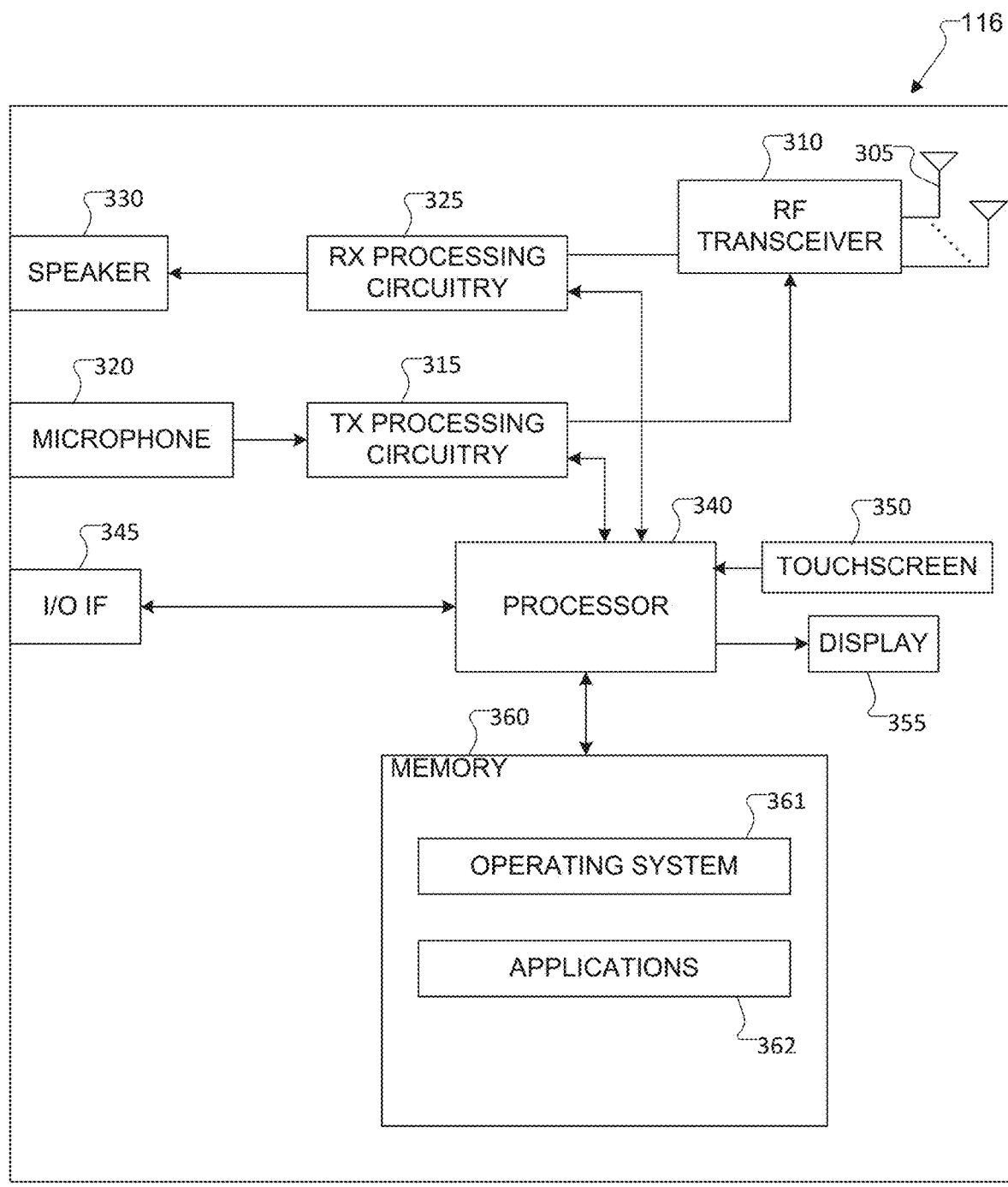
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

Certain embodiments of the disclosure may be derived by utilizing a combination of several of the embodiments listed below. Also, it should be noted that further embodiments may be derived by utilizing a particular subset of operational steps as disclosed in each of these embodiments. This DOI should be understood to cover all such embodiments.

Certain embodiments of the present disclosure are described assuming cellular DL communications. However, the same/similar principles and related signaling methods & configurations can also be used for cellular UL & sidelink (SL).

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one core network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116 as well as a UE 117, which may be located in a third residence (R), and a UE 118, which may be located in another residence (R). In some embodiments, one or more of the gNBs 101-103 may communicate with each other and with the UEs 111-118 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of gNB 101, gNB 102 and gNB 103 include a two-dimensional (2D) antenna arrays as described in embodiments of the present disclosure. In some embodiments, one or more of gNB 101, gNB 102 and gNB 103 support the codebook design and structure for systems having 2D antenna arrays.

As described in more detail below, one or more of the gNBs 101-103 include circuitry, programing, or a combination thereof, for performing the audit correction to obtain a result based on a computed score for each candidate value of the one or more of the BS configuration parameters; generating, based on the result, one or more corrective actions; and adjusting at least one of the BS configuration parameters based on the one or more corrective actions.

In certain embodiments, gNB 102 may be connected to the core network 130 by a fiber/wired backhaul link. As indicated herein above, gNB 102 serves multiple UEs 111-116 via wireless interfaces respectively. Using this wireless interface, a UE 116 receives and transmit signals to gNB 102. Using signals received from a non-serving gNB 103, a UE 116 may also receive signals from a neighboring gNB 103. The core network 130 may further include a core network entity (CNE) 135, which responsible for the task of site audit correction, as described herein below. In certain embodiments, the CNE 135 is a base station, such as gNB 103.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing. The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n. In certain embodiments, the RF transceivers 210a-210n perform transmission and reception via radio waves or wired communications. For example, communications may be accomplished via wired connections, optical fiber systems, communication satellites, radio waves, and the like.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. That is, the controller/processor 225 can perform a blind interference sensing (BIS) process, such as performed by a BIS algorithm, and decode the received signal subtracted by the interfering signals. Any of a wide variety of other functions can be supported in the gNB 102 by the controller/processor 225. In some embodiments, the controller/processor 225 includes at least one microprocessor or microcontroller In certain embodiments, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also capable of supporting channel quality measurement and reporting for systems having 2D antenna arrays as described in embodiments of the present disclosure. In some embodiments, the controller/processor 225 supports communications between entities, such as web RTC. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM. In certain embodiments, a plurality of instructions, such as a BIS algorithm is stored in memory 230. The plurality of instructions is configured to cause the controller/processor 225 to perform the generation and calibration of a signal strength prediction in a wireless communication system.

As described in more detail below, the transmit and receive paths of the gNB 102 (implemented using the RF transceivers 210a-210n, TX processing circuitry 215, and/or RX processing circuitry 220) support generation and calibration of a signal strength prediction in a wireless communication system.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350 (or key pad), a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for UL transmission on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
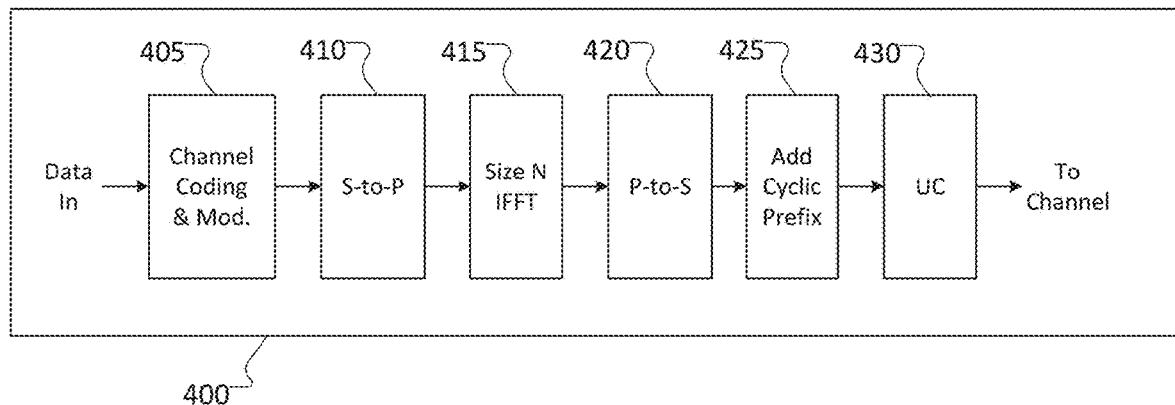
FIG. 4A illustrates a high-level diagram of an orthogonal frequency division multiple access transmit path according to embodiments of the present disclosure.
Figure 4B:
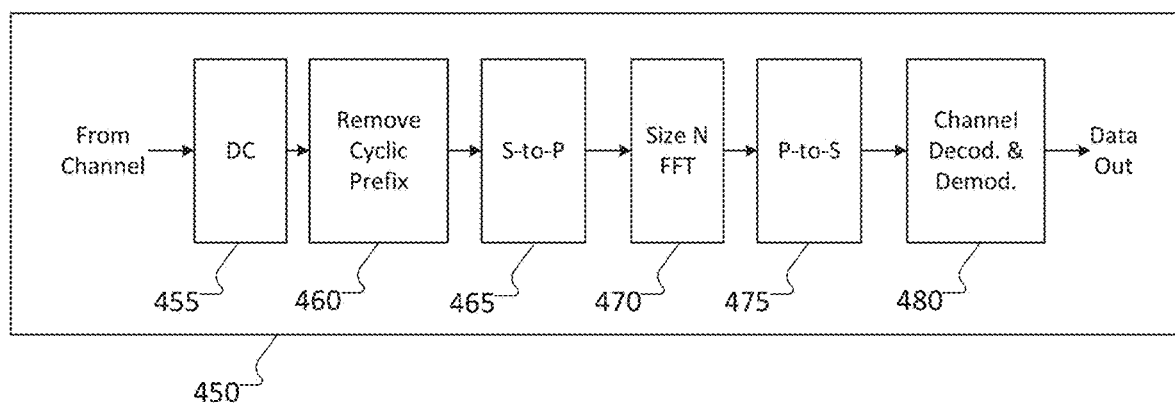
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

To meet the demand for wireless data traffic having increased since deployment of 4G communication systems, and to enable various vertical applications, 5G communication systems have been developed and are currently being deployed.

The 5G communication system is considered to be implemented to include higher frequency (mmWave) bands, such as 28 GHz or 60 GHz bands or, in general, above 6 GHz bands, so as to accomplish higher data rates, or in lower frequency bands, such as below 6 GHz, to enable robust coverage and mobility support. Aspects of the present disclosure may be applied to deployment of 5G communication systems, 6G or even later releases which may use THz bands. To decrease propagation loss of the radio waves and increase the transmission distance, the beamforming, massive multiple-input multiple-output (MIMO), full dimensional MIMO (FD-MIMO), array antenna, an analog beam forming, large-scale antenna techniques are discussed in 5G communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement (ACK) information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

FIGS. 5A-D illustrate base station configuration parameters and corresponding effect on a received power heat map according to embodiments of the present disclosure. The embodiments of the base station configuration parameters and corresponding effect on a received power heat map shown in FIGS. 5A-D are for illustration only and other embodiments can be used without departing from the scope of the present disclosure.

Figure 5A:
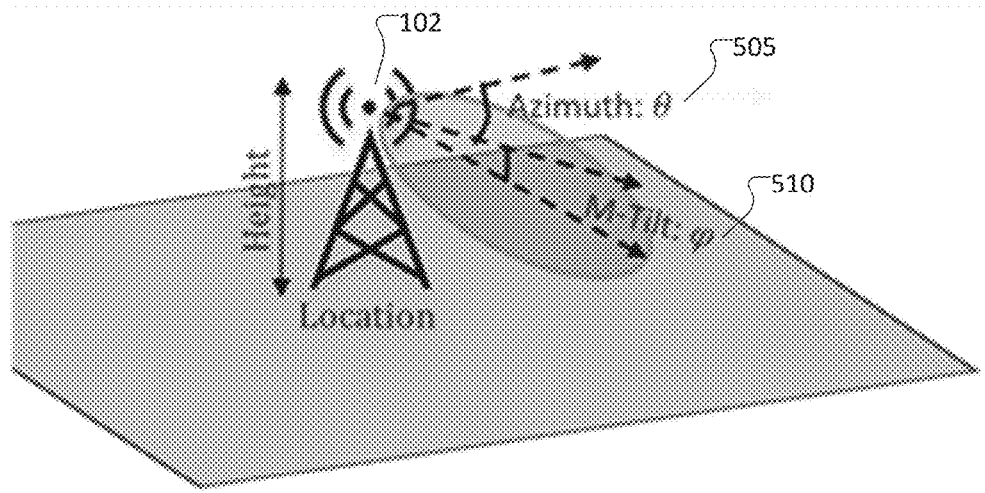
FIGS. 5A-D illustrate base station configuration parameters and corresponding effect on a received power heat map according to embodiments of the present disclosure.
Figure 5B:
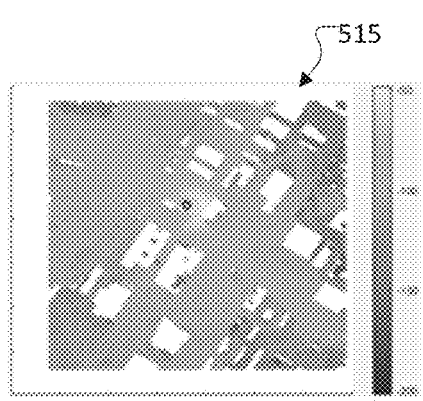
Figure 5C:
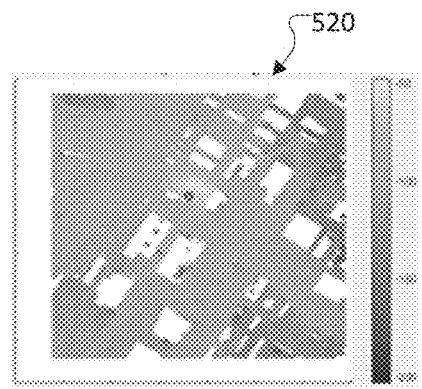
Figure 5D:
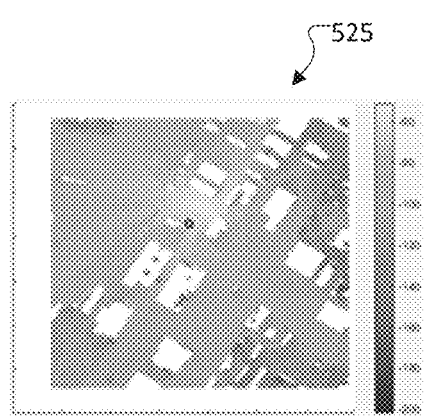

The configuration of a gNB 102 can involve many different parameters, such as their location, antenna height, antenna pattern, mechanical tilt (M-tilt), electrical tilt (E-tilt), azimuth angle, and the like. As illustrated in FIGS. 5A-D, these parameters may impact the coverage pattern of a BS significantly. For example, FIG. 5B illustrates a received power heat map 515 when an azimuth θ=0°; FIG. 5C illustrates a received power heat map 520 when an azimuth θ=55° and M-tilt φ=9'; and FIG. 5D illustrates a received power heat map 525 when an azimuth θ=55° and M-tilt φ=3°.

Consequently, referring again to FIG. 1, the parameters of gNB 102 may substantially impact the service quality to UEs 111-116. An incorrectly chosen set of these parameters can degrade network coverage and cause a plethora of issues, such as coverage islands, coverage holes, cell overshoot problems, and so forth. Therefore, significant effort is spent in network planning and optimization to determine an optimal choice of these parameters prior to installing BSs. Some of these parameters may also be reconfigurable, such as the azimuth angle θ 505, E-tilt, M-tilt φ 510, and the like, and may be changed by the network service provider to adapt to a changing radio-frequency (RF) environment. The reconfiguration of azimuth angle θ 505 and M-tilt φ 510, in particular, may require intervention by a site engineer and may be prone to human error. Examples of such errors may include misalignment with the desired angle, swapping of antenna ports, use of uncalibrated measurement equipment, and so forth. Environmental conditions like wind, earthquakes, birds, and the like, can also impact the physical orientation of the antenna affecting these parameters over time. Finally, since these BS parameters are stored in a database, the BS parameters may also be prone to book-keeping errors. While misaligned BS parameters may degrade performance, book-keeping errors may lead to incorrect estimates of network performance and can adversely affect many self-organization network (SON) applications. Thus, due to the critical impact of BS parameters on network performance, a mechanism may be required to estimate the currently configured set of BS parameters. This task of predicting and correcting the BS configuration parameters is often referred to as the site audit correction problem.

Figure 6:
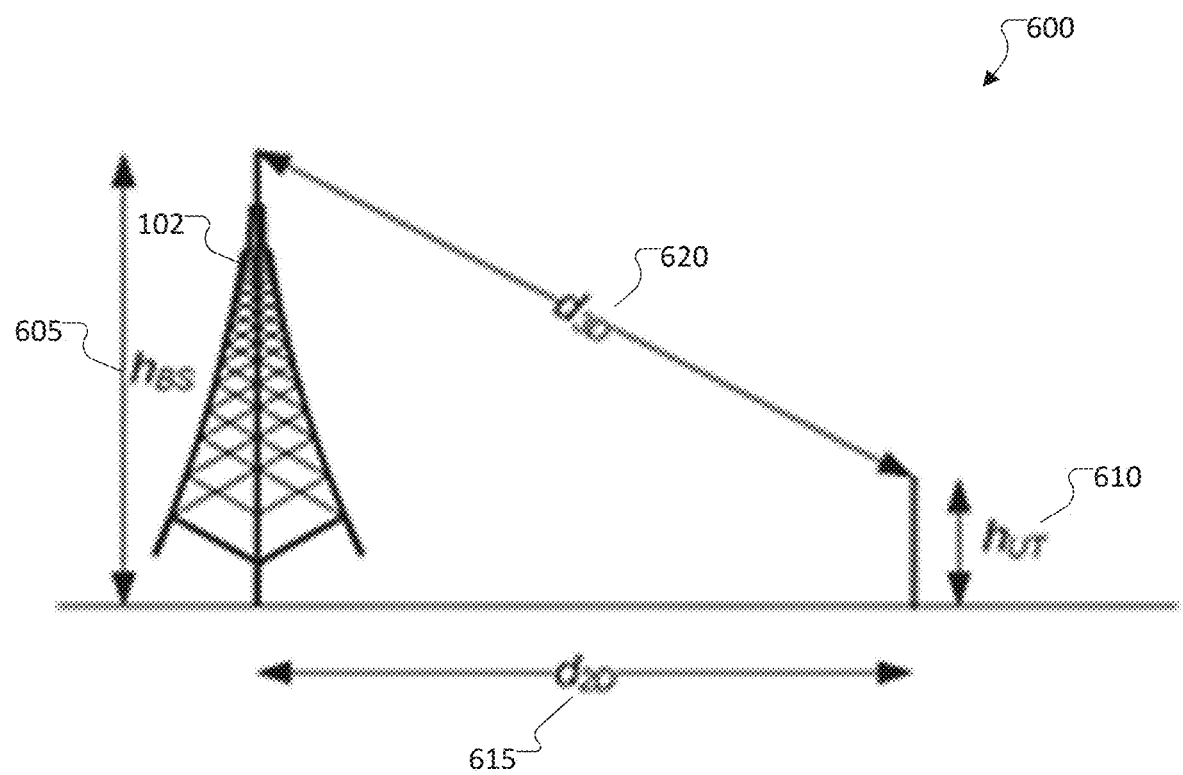
FIG. 6 illustrates a statistical pathloss model according to embodiments of the present disclosure.

FIG. 6 illustrates a statistical pathloss model according to embodiments of the present disclosure. The embodiment of the pathloss model 600 shown in FIG. 6 is for illustration only. Other embodiments could be used without departing from the scope of the present disclosure.

In the example shown in FIG. 6, BS 102 has a certain height ($h_{BS}$) 605 and a user terminal, such as UE 116, has a certain height ($h_{UT}$) 610. The UE 116 and BS 102 are a first horizontal distance from each other ($d_{2D}$) 615 and, due to difference in height, a certain three-dimensional distance from each other ($d_{3D}$) 620.

Based on the different heights and distances, a pathloss model for the communication between BS 102 and UE 116 can be defined as follows:

TABLE 1

UMa

Line of Sight (LOS):

$$PL_{UMa-LOS} = \begin{cases} PL_1 & 10 \text{ m} \le d_{2D} \le d'_{BP} \\ PL_2 & d'_{BP} \le d_{2D} \le 5 \text{ m} \end{cases}$$

$\sigma_{SF} = 4$, $1.5 \text{ m} \le h_{UT} \le 22.5 \text{ m}$, $h_{BS} = 25 \text{ m}$ $$PL_1 = 28.0 + 22\log_{10}(d_{3D}) + 20\log_{10}(f_c)$$

$$PL_1 = 28.0 + 40\log_{10}(d_{3D}) + 20\log_{10}(f_c) - 9\log_{10}((d'_{BP})^2 + (h_{BS} - h_{UT})^2)$$

Non-Line of Sight (nLOS):

$$PL_{UMa-NLOS} = \max(PL_{UMa-NLOS}, PL'_{UMa-NLOS})$$

for $10 \text{ m} \le d_{2D} \le 5 \text{ km}$ $\sigma_{SF} = 6$, $1.5 \text{ m} \le h_{UT} \le 22.5 \text{ m}$, $h_{BS} = 25 \text{ m}$ $$PL'_{UMa-NLOS} = 13.54 + 39.08\log_{10}(d_{3D}) + 20\log_{10}(f_c) - 0.6(h_{UT} - 1.5)$$

Optional:

$$PL = 32.4 + 20\log_{10}(f_c) + 30\log_{10}(d_{3D})$$

$\sigma_{SF} = 7.8$

Figure 7:
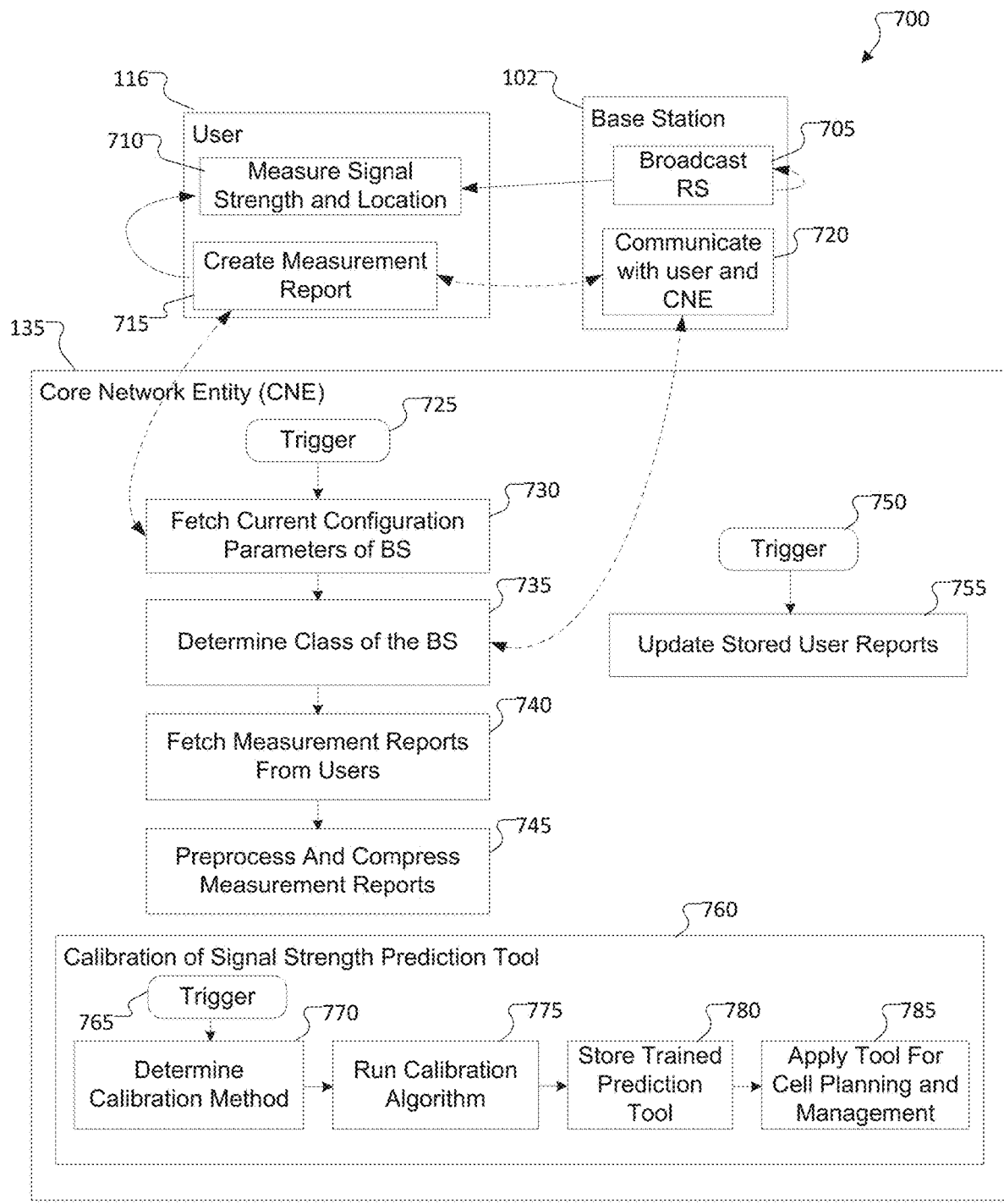
FIG. 7 illustrates a site audit process according to embodiments of the present disclosure.

FIG. 7 illustrates a site audit process according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter and processor circuitry in, for example, a respective UE, core network entity, and base station. Process 700 can be accomplished by, for example, UE 116, gNB 102, and CNE 135 in network 100. The different operations and associated embodiments are described in more detail with respect to FIGS. 7-9.

The gNB 102 periodically transmits a reference signal (RS) 705 and also provides a communication link to the UE 116 and the CNE 135. The UE 116 receives the RS and measures the reference signal received power (RSRP) in block 710. In certain embodiments, the UE 116 includes additional sensors that are configured to obtain other information including an estimate of a location of the UE 116, as shown in block 710. In block 715, the UE 116 periodically encodes all this information and RSRP values into measurement reports. In response to a query, the UE 116 transmits the measurement reports to the CNE 135. In certain embodiments, the UE 116 receives the query from the CNE 135 directly or via the gNB 102 in block 720. In certain embodiments, the UE 116 receives the query from the gNB 102 in block 720. In certain embodiments, the UE 116 transmits the measurement reports directly to the CNE 135, via the gNB 102 in block 720, or via an alternate route.

The CNE 135 is responsible for generating and calibrating the signal-strength prediction tool. The prediction tool can be a prediction model configured to predict reference signal received power (RSRP) values for the BS. In response an external trigger 725, the CNE 135 initiates a data collection process for a target gNB 102 by fetching the information on the BS configuration parameters in block 730. That is, in block 730, the CNE 135 fetches current BS configuration parameters. In block 735, because the CNE 135 may have separate prediction tools for different classes of BSs, the CNE 135 determines the appropriate class for the target BS. In block 740, CNE 135 fetches measurement reports from one or more UEs 111-116 in a vicinity of gNB 102. Then, in block 745 CNE 135 preprocesses and compresses the fetched user reports and the associated BS side information. In block 745, the CNE 135 also stores the preprocessed and compressed measurement reports and BS side information. Upon receiving another trigger 750, the CNE 135 may also further update the stored user reports in block 755. The CNE 135 is further configured to utilize a calibration of signal strength prediction tool 760. Periodically or upon receiving a trigger 765, the CNE 135 may initiate the calibration of the signal strength prediction tool 760 for a certain class of BSs. The calibration of the signal strength prediction tool 760 further involves determining the calibration method for the BS class in block 770, running the calibration method in block 775, storing the calibrated tool in block 780, and finally applying the calibrated tool for various planning and management tasks, such as cell planning and management, in block 78. The details of each of these individual steps is elaborated in more detail with respect to FIGS. 8-9.

In certain embodiments, gNB 102 broadcasts a reference signal (RS) to enable users in its neighborhood to measure the signal strength via an RSRP measurement. This RS may be an existing RS present in the 3GPP framework or can be a new RS transmitted with a pre-determined beam shape. The RS may either be broadcast periodically or may be triggered by a network condition. Both served UEs 111-114 and non-served UEs 115-116 in the neighborhood of gNB 102 may correspondingly measure the RSRP from gNB 102. The UEs 111-118 may be network subscribers or may be agents deployed by the service provider, such as to operate as RF scanners. The UEs 111-118 may be equipped with a global positioning system (GPS), altimeter, accelerometer gyroscope, and the like, and may periodically measure their location estimate, altitude, orientation, and so forth. Thus over time, UE 116 can create and save measurement reports, containing: (i) the time stamp of the report, (ii) RSRP for the serving gNB 103, (iii) RSRP from a neighboring gNB 102, (iv) the physical cell identifier (PCI) for the corresponding serving and neighboring BSs, (v) an estimate of the UE location, (vi) altitude of the UE, (vii) an indicator of the accuracy of the user location, (viii) orientation of the UE, (ix) a flag indicating the connectivity to a WiFi service, (x) an identifier for the make/model of the UE, (xi) timing advance configured for the UE, (xii) an indicator about whether the user is indoor or outdoor, (xiii) an indicator whether the user has a line-of-sight (LoS) path to the target gNB 103, and the like. Over a period of time, several such reports can be collected and saved, and the entries from these measurement reports may also be deleted by the UE 116 after an expiration time.

The CNE 135 is responsible for planning and management of the BSs within its service area. In certain embodiments, the CNE 135 also includes a signal strength prediction tool 760 required for such planning and management task. In certain embodiments, the CNE 135 is a base station, such as gNB 103 itself. In certain embodiments, the CNE 135 initiates a measurement report collection from a target BS, such as gNB 103, based on an external trigger. An example for such a trigger can be expiration of a timer, the output of a root cause analysis algorithm, and the like. In certain embodiments, based on the trigger, the CNE 135 collects and pools the measurement reports from user terminals, such as one or more or UE's 115-118, in the neighborhood of gNB 103. These users may also include user terminals, such as UE's 111-116, associated with a neighboring gNB 102. The transmission of the reports to the CNE 135 can be triggered periodically by a timer, by a specific user device condition, or cam be triggered by gNB 103 or CNE 135 via a signaling message. The signaling message may also include a list of attributes to report and conditions for a user to be eligible for reporting. For example, CNE 135 may already have pooled several reports and may only desire reports from a specific critical angular direction of gNB 103. In certain embodiments, the measurement reports from UE 118 may first be transmitted to gNB 103 via the cellular link. The gNB 103 may collect multiple such reports, process then and may then forward to the CNE 135 via the backhaul link. In certain embodiments, the reports may be collected by the CNE 135 via an alternate mechanism, such as a wireless fidelity (Wi-Fi) service. A user may periodically measure and create the user reports or may initiate measurement upon being triggered by gNB 103.

In certain embodiments, the CNE 135 also maintains a database of configuration parameters of the BSs in its service area. Examples of such configuration parameters include the BS location, height, antenna pattern, mechanical tilt (M-tilt), electrical tilt (E-tilt), azimuth angle, line-of-sight (LoS) classification of surrounding area, indoor-outdoor classification of the surrounding area etc. In certain embodiments, the CNE 135 queries the target gNB 103 in order to obtain this information. Some of the parameters in the database may be inaccurate or missing. In certain embodiments, CNE 135 maintains a classifier, such as a classifying processor or processing circuitry that classifies the BSs in its service area into several classes. For example, CNE 135 can include instructions that cause one or more processors to perform a classification of BSs within a service area of the CNE 135. Such a determination can be based on the BS parameters, the BS's local topography, number or type of user reports, the available information about the BS etc. The classes can either be pre-determined or can be determined from the data based on, for example, a clustering algorithm. For example, BSs with similar antenna pattern can be assigned in one class, BSs with a similar scattering scenario (Urban Miro/Urban Macro/Rural, and the like) can be assigned in one class, or BSs with LoS classification available for their surrounding area can be assigned into one class. The CNE 135 can preprocess the collected reports and the corresponding BS configuration parameters and save them in a data table. The table attributes can include a time stamp or expiration timer for the data, the received signal strength of users, the location of users, BS configuration parameters, and the like. In certain embodiments, the collected data may be compressed before saving in the table. For example, instead of storing the user location and BS location, CNE 135 can store only the relative location of the user with respect to the BS or can store the relative azimuth and elevation angle of the user with respect to gNB 103. CNE 135 also can be responsible for managing the collected data-tables, to prevent faulty, unwanted or stale data. For example, upon triggering of an expiration timer or upon receiving an external trigger, such as a key performance indicator (KPI) condition for gNB 103, CNE 135 can discard some or all entries from the data table corresponding to gNB 103.

In certain embodiments, gNB 103, namely a target BS, is responsible for collecting the user reports from the users in its coverage region and forwarding to CNE 135. The data collection can be initiated by CNE 135 or by gNB 103 and can inform the user terminals, UE's 115-118, via a signaling message as elaborated in previous paragraph. In certain embodiments, upon collection of the user reports, gNB 103 appends the current BS configuration parameter information to the reports and compiles them into a data table. In certain embodiments, gNB 103 further compresses the information prior to creation of the table and may then forward the table to CNE 135. Upon receiving a trigger, such as observing an anomaly or degradation in KPI, gNB 103 also can inform CNE 135 about the possible corruption in the transmitted data tables. Upon identifying a correction to the book values of a certain BS parameter such as via a site audit correction process, gNB 103 also can inform CNE 135 about the change to the data table.

In certain embodiments, there are two phases. In the first phase, data is collected from user terminals, one or more of UE's 115-118, associated with a target BS, gNB 103, for which the BS parameters affecting RSRP are known. As described above, these user reports along with the BS parameters can be stored in a data table at CNE 135 and herein will be referred to as the training data. In the second phase, a calibrated model can be used to predict signal strength at a given location from target gNB 103 based on known or nominal values of the target BS parameters, and the like. These known or nominal values are referenced as the test data. Training and test data can be collected at the same level of detail regarding, for example, whether LoS/nLoS classification or indoor/outdoor classification of area around the BS, and so forth, is available. The collected user data may include among others such as:

RSRP level measured at the user;
location information such as: latitude, longitude, or height relative to ground/sea level;
Line-of-Sight indicator;
whether the measurement was taken outdoors, inside a car, in a building, or the like;
whether the measurement was collected using special, highly accurate equipment or a cell phone app intended for mass distribution, or the like;
Regarding the base station, any parameters that are known a priori, such as a location, height, E-tilt, and so forth, may be treated as known values in the model for RSRP.
In certain embodiments, the LoS and indoor/outdoor classification of the users may be made by the BS parameters.

In one illustrative example, how preprocessing of data may involve transformations, which enable models trained in one location to be applied at other locations, is provided. It is noted that scope of such transformations are not limited to those described herein. For example, given UTM coordinates of the base station antenna by $(x_{cell}, y_{cell}, z_{cell})$ and the UTM coordinates of a given user terminal by $(x_{ue}, y_{ue}, z_{ue})$, the displacement vector to the user terminal can be calculated as follows:

$$\Delta x_{ue} = x_{ue} - x_{cell} \quad (1)$$

$$\Delta y_{ue} = y_{ue} - y_{cell} \quad (2)$$

$$\Delta z_{ue} = z_{ue} - z_{cell} \quad (3)$$

These coordinate may further be adjusting using known target BS parameters, such as antenna azimuth angle θ and M-tilt $\psi_M$ according to:

$$\begin{bmatrix} \widetilde{\Delta x_{ue}} \\ \widetilde{\Delta y_{ue}} \\ \widetilde{\Delta z_{ue}} \end{bmatrix} = R_2 R_1 \begin{bmatrix} \Delta x_{ue} \\ \Delta y_{ue} \\ \Delta z_{ue} \end{bmatrix} \quad (4)$$

Where:

$$R_1 = \begin{bmatrix} \cos(\theta) & \sin(\theta) & 0 \\ -\sin(\theta) & \cos(\theta) & 0 \\ 0 & 0 & 1 \end{bmatrix}, \text{ and} \quad (5)$$

$$R_2 = \begin{bmatrix} \cos(\psi_M) & 0 & -\sin(\psi_M) \\ 0 & 1 & 0 \\ \sin(\psi_M) & 0 & \cos(\psi_M) \end{bmatrix}$$

In a spherical coordinate system relative to the BS:

$$r_{ue} = \sqrt{\widetilde{\Delta x_{ue}}^2 + \widetilde{\Delta y_{ue}}^2 + \widetilde{\Delta z_{ue}}^2} \quad (6)$$

$$\theta_{ue} = \operatorname{atan}(\widetilde{\Delta y_{ue}}, \widetilde{\Delta x_{ue}})$$

$$\psi_{ue} = \operatorname{asin}\left(-\frac{\widetilde{\Delta z_{ue}}}{r_{ue}}\right)$$

The above transformations provide an example of feature extraction/preprocessing from raw data collected from the user to coordinates which are relative to the BS. Any one of CNE 135, gNB 102, or UE 116 can perform and complete the aforementioned preprocessing task.

Management of the Data Tables:

In certain embodiments, CNE 135 also is responsible for managing the collected and stored data tables, such as shown in blocks 750 and 755 in FIG. 7. This includes periodically checking and deleting old data entries as well as identifying issues with the collected data and correcting the identified issues. For example, in certain embodiments, the data table entries can include a time of creation field, and CNE 135 may delete entries after a certain time has passed. In certain embodiments, CNE 135 limits the amount of data collected for each BS class. Correspondingly, upon collection of new data in gNB 103 in a respective BS class, CNE 135 may delete some old entries for the respective BS class. During the deletion process, CNE 135 is configured to ensure that sufficient data samples exist from each critical region around gNB 103. In certain embodiments, CNE 135 receives a trigger in block 750 regarding a poorly performing or mis-configured BS. In such a scenario, CNE 135 may delete the data entries collected from that particular BS and may trigger, in block 765, the re-calibration procedure for that BS class after removing the corrupted data entries.

Selecting the Model and Calibration Procedure:

As illustrated in the calibration of the signal strength prediction tool 760 based on a trigger in block 765, CNE 135 can initiate the calibration of the signal strength prediction tool 760 for a class of BSs using the collected data tables. In certain embodiments, the signal strength prediction tool can be raytracing, a statistical channel model, or any other model. The trigger in block 765 can be, for example, an expiration of a timer, a collection of new data exceeding a threshold, an alarm indicating that the newly collected data does not fit the previously calibrated tool, and the like. For example, for freshly collected data from a target BS of a particular class, CNE 135 can first perform a "goodness of fit" test, such as the Chi-squared test, Kolmogorov-Smirnov test, or the like, to validate if the newly collected data fits the existing calibrated model for that class. When a sufficient fit is not found, CNE 135 can signal an alarm for re-calibration of the signal strength prediction tool 760 for that particular BS class after including the newly collected data. In certain embodiments, the re-calibration procedure depends on the available information for the BSs of that class (e.g., is user altitude available?; Is LoS classification available?, and so forth). Several approaches are possible for re-calibrating the signal strength prediction tool.

Figure 8:
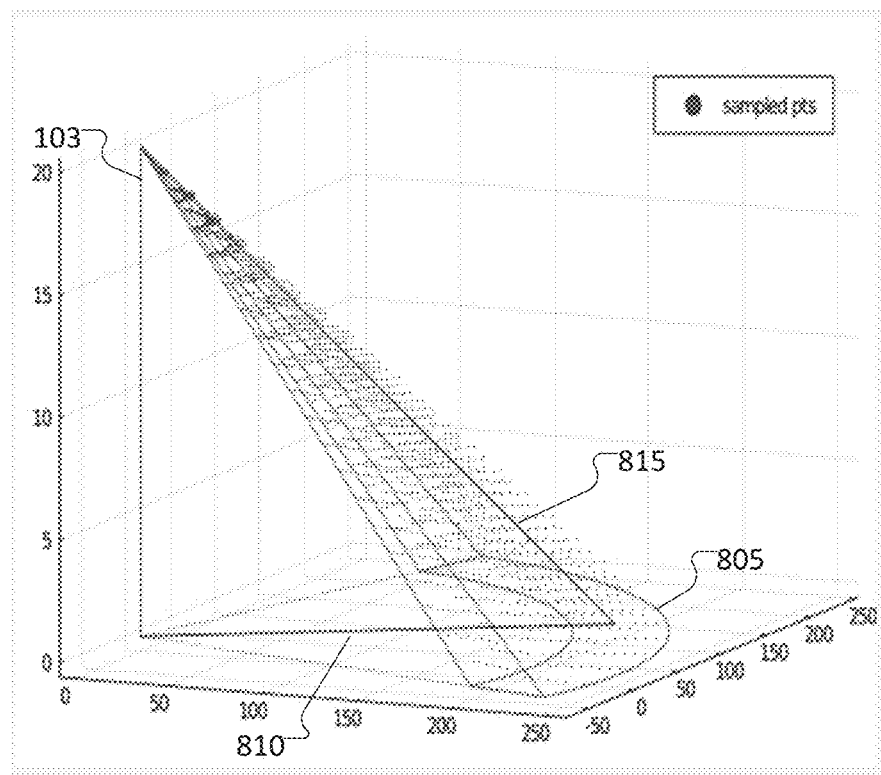
FIG. 8 illustrates an example of partitioning for a prediction tool according to embodiments of the present disclosure.

FIG. 8 illustrates an example of partitioning for a prediction tool according to embodiments of the present disclosure. The embodiment of the partitioning shown in FIG. 8 is for illustration only. Other embodiments could be used without departing from the scope of the present disclosure.

According to certain embodiments, the prediction tool does not require map data. For example, CNE 135 can partition the user terminals, such as one or more UE's 115-118, into soft partitions 805 based on azimuth 810 and elevation angle 815 with respect to gNB 103. For a user terminal, such as UE 116, in a particular partition n, the RSRP prediction is generated according to:

$$\widehat{RSRP}_u = \sum_k c_{k,j}(\log(d))^{k-1} \quad (7)$$

$$Pr(\widehat{RSRP}_u = y) = \sum_j w_j \left[ \frac{1}{2\beta_j} \exp\left\{ -\frac{\left| y - \sum_k c_{k,j}(\log(d))^{k-1} \right|}{\beta_j} \right\} \right] \quad (8)$$

where $c_{k,j}$, $\beta_j$, $w_j$ are separately tunable parameters for each partition n, which can be calibrated using measured data as illustrated herein below with respect to FIG. 9. The value, d, is the distance from gNB 103 in meters. Additionally, mixture models offer robustness in the face of uncertainty regarding data generation. The mixture models may be used to generate point, interval, or distributional estimates of signal strength.

Figure 9:
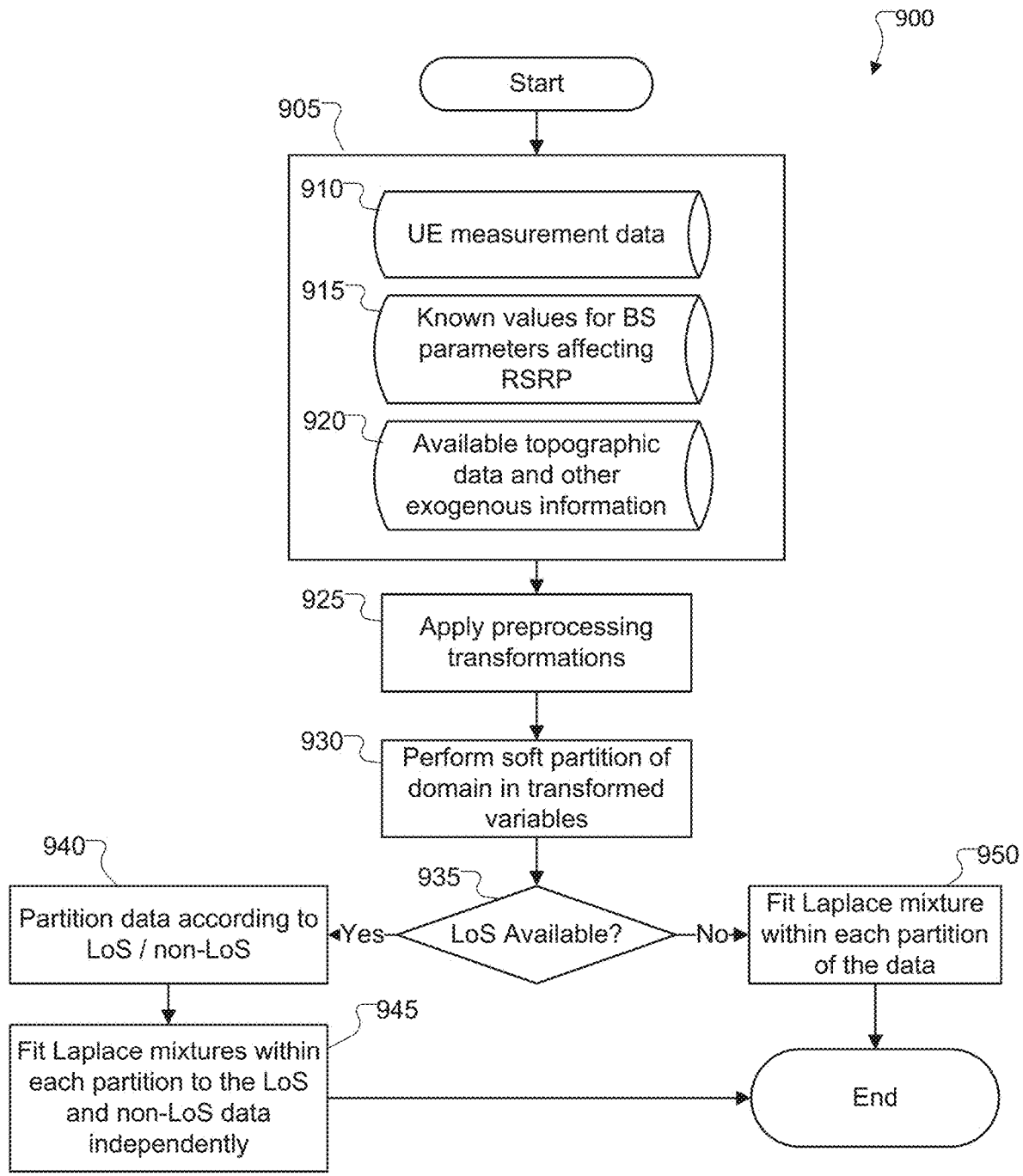
FIG. 9 illustrates a process for model calibration by a core network entity according to embodiments of the present disclosure.

FIG. 9 illustrates a process for model calibration by a core network entity according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter or processor chain in, for example, a gNB or a core network entity. Process 900 can be accomplished by, for example, gNB 102, gNB 103, or CNE 135 in network 100.

In block 905, the CNE 135 obtains and stores data, such as UE measurement data 910, BS parameter data 915, and topological and other exogenous forms of data 920. The UE measurement data 910 can be obtained from one or measurement reports obtained from one or more of UE's 115-118 regarding gNB 103. The measurement reports can include RSRP values for nearby cells, such as gNB 102, along with other parameters such as location estimates, and the like. The topological and other exogenous forms of data 920 includes geographic information, such as surrounding one or more of gNB 102 and gNB 103.

In block 925, CNE 135 can apply preprocessing transformation operations, such as described herein above. In block 930, CNE 135 partitions data in the transformed coordinates. The CNE 135 further determines whether an LoS indicator is available in block 935.

If the CNE 135 determines that an LoS indicator is available, in block 940, the CNE 135 partitions the data according to a LoS and nLoS. Additionally, the CNE 135 fits mixture models separately into the LoS and nLoS data in block 945. A possible soft partition of the training data may be obtained by first calculating:

$$\theta_{min} = \min_{ue \in training\ data} \{|\theta_{ue}|\}, \quad (9)$$

$$\theta_{max} = \max_{ue \in training\ data} \{|\theta_{ue}|\}, \quad (10)$$

$$\psi_{min} = \min_{ue \in training\ data} \{|\psi_{ue} - \psi_{ue}^E|\}, \quad (11)$$

$$\psi_{max} = \max_{ue \in training\ data} \{|\psi_{ue} - \psi_{ue}^E|\} \quad (12)$$

where $\psi_{ue}^E$ is the presumably known electrical downtilt of the base station corresponding to the measurements. Taking $\Delta\theta = 60$ degrees and $\Delta\psi = 4$ degrees, the grid points are defined according to:

$$\theta_{centers} = (\theta_{min} + 0.5\Delta\theta) : (0.1\theta) : (\theta_{max} - 0.5\Delta\theta) \quad (13)$$

$$\psi_{centers} = (\omega_{min} + 0.5\Delta\psi) : (0.1\psi) : (\psi_{max} - 0.5\Delta\psi) \quad (14)$$

Additionally, a soft partition is designed by assigning for each $(\theta_c, \psi_c) \in \theta_{centers} \times \psi_{centers}$, according to Equation 15:

$$N(\theta_c, \psi_c) = \{ue \in training\ set \|\theta_{ue} - \theta_c| \leq 0.5\Delta\theta \text{ and } |\psi_{ue} - \psi_{ue}^E - \psi_c| \leq 0.5\Delta\psi\} \quad (15)$$

LoS Procedure:

Physical considerations imply that RSRP may depend on $\log(r_{ue})$ within each neighborhood. The CNE 135 architecture and algorithms are flexible enough to accommodate this selection. For example, in block 945, to fit a corresponding Laplace mixture is obtained according to:

$$\max_{z,w,\beta,c} \sum_{i,j} z_{i,j} \left( \log(w_j) + \log\left( \frac{1}{2\beta_j} e^{-\frac{|y_i - \sum_k c_{k,j}(\log(r_i))^{k-1}|}{\beta_j}} \right) \right) \quad (16)$$

Which is subject to:

$$\Sigma_j z_{ij} = 1, \forall i \quad (17)$$

$$\Sigma_j w_j = 1 \quad (18)$$

$$z_{ij} \geq 0, \forall i,j. \quad (19)$$

In the above, w is the vector of weights applied to each of the mixture components, $r_i$ is the distance to the BS of the $i^{th}$ observation, $y_i$ is the measured value of RSRP, $c_{k,j}$ are coefficients that specify the conditional mean of the distribution, $\beta_j$ are the scaling parameters, and $z_{ij}$ are indicator variables for whether the $i^{th}$ observation was generated by the $j^{th}$ component of the mixture. When LoS indicators are available in block 935, the CNE 135 fits two such distributions independently to the data according to whether the data is LoS or nLoS in block 940. If we decide to fit a single component to each of the LoS and nLoS data, optimization over the $z_{11}$ may be avoided.

Alternatively, if the CNE 135 determines that no LoS indicator is available in block 935, CNE 135 fits a Laplace mixture with possibly more components is into the data in block 950.

nLoS Procedure:

The optimization problem for the case where a LoS indicator is unavailable is mathematically equivalent to the one described above for the LoS procedure. A key consideration is whether to use more components in the mixture (indexed by j above) to compensate for hidden characteristics of the measurements (i.e., whether or not the measurement is from a LoS location).

Figure 10:
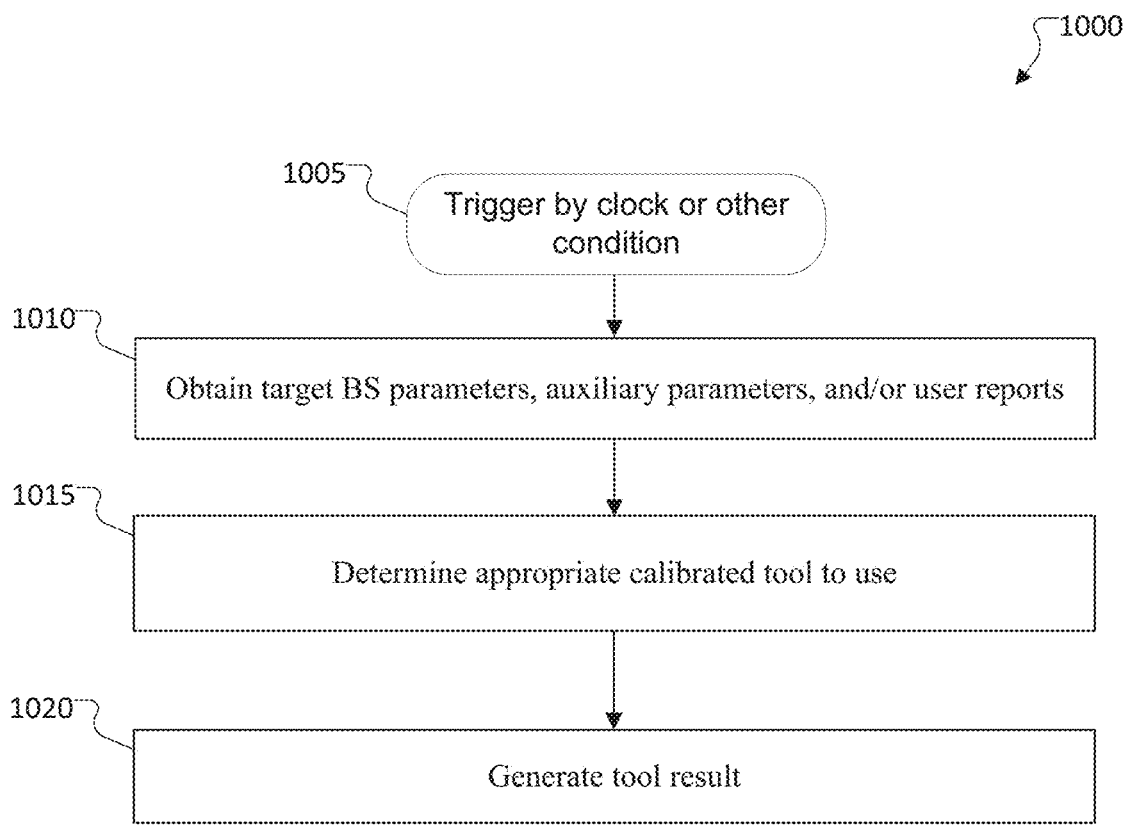
FIG. 10 illustrates a process for signal strength prediction according to embodiments of the present disclosure.

Generating Signal Strength Prediction:

FIG. 10 illustrates a process for signal strength prediction according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter or processor chain in, for example, a BS. Process 1000 can be accomplished by, for example, gNB 102 or gNB 103 in network 100.

Based on the calibrated tools, CNE 135 can generate the signal strength prediction for the area surrounding a new target site, such as a new target gNB 103. In block 1005, CNE 135 receives a trigger to generate the prediction result for a target gNB 103. Such a trigger can be, for example, an alarm indicating a poorly performing BS, an alarm from a site requiring reconfiguration, or the like. To generate the prediction, in block 1010 CNE 135 queries the target gNB 103 to obtain system parameters for gNB 103, such as a location, height, antenna pattern, azimuth and tilt angles, and the like, for gNB 103. CNE 135 also can obtain from gNB 103, or another source, auxiliary information about the gNB 103 such as the LoS classification of the surrounding area etc. In some embodiments, CNE 135 also can query users of the target gNB 103 to send reports of measured RSRPs and their locations. Using the available information, in block 1015, CNE 135 determines the BS class and appropriate calibrated tool to use. For example, a different class model can be used depending on whether LoS information is available or not. Finally, in block 1020, the output of the prediction can be generated.

In certain embodiments, the output of the prediction can be the mean received signal strength in the area surrounding CNE 135. In certain embodiments, a set of user locations can be given as an input and the mean received signal strength can be predicted at those locations. In certain embodiments, a set of observations (user RSRPs and locations) can be given as an input and the output of the algorithm can be a score or a likelihood that the observations satisfy the prediction tool. An example use case of the last embodiment is for the site audit correction as illustrated herein below with respect to FIG. 11.

Figure 11:
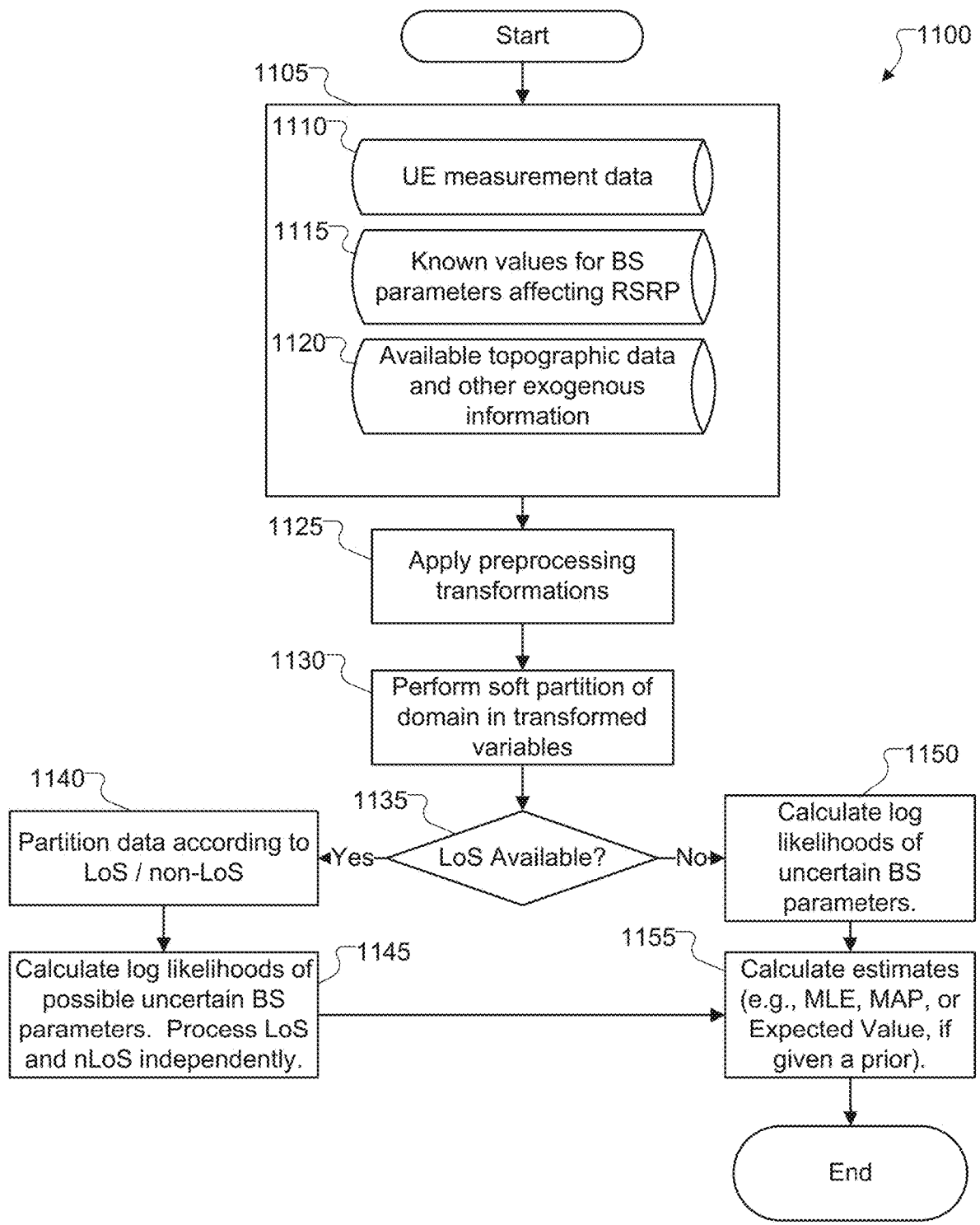
FIG. 11 illustrates a process for site audit correction according to embodiments of the present disclosure.

FIG. 11 illustrates a process for site audit correction according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter or processor chain in, for example, a gNB or a core network entity. Process 900 can be accomplished by, for example, gNB 102, gNB 103, or CNE 135 in network 100.

Example use cases for the disclosed CNE 135 and the prediction tool and calibration algorithms are as follows:

1) To calibrate signal strength prediction tools, such as raytracing, without performing effort-intensive drive tests and post processing;

2) To enhance cell planning and optimization by improving accuracy of signal strength prediction; and 3) To identify mis-aligned/faulty BSs in a quick and cost effective manner without manual intervention (site audit correction).

It is noted that site audit correction refers to the task of estimating and correcting misaligned or incorrectly configured BS parameters such as the azimuth angle, mechanical downtilt, and the like. Below we provide a sample workflow for the application of RSRP estimation to Site Audition. Note that the workflow bears many similarities to the workflow for training the parameter illustrated in the process 900 for model calibration by a core network entity in FIG. 9. For an example of the likelihood estimation, for each data point collected, one may find in the training data the element of the soft partition which is most similar for the nominal BS parameters we are attempting the log likelihood calculation. After identifying a neighborhood, the Laplace mixture fit previously for the training data is used to assign a likelihood to this value. Note that this workflow shares many similarities with the workflow in FIG. 9 used for training, indicating that there are many opportunities for software reuse in an implementation.

In block 1105, the CNE 135 obtains and stores data, such as UE measurement data 1110, BS parameter data 1115, and topological and other exogenous forms of data 1120. The UE measurement data 1110 can be obtained from one or measurement reports obtained from one or more of UE's 115-118 regarding gNB 103. The measurement reports can include RSRP values for nearby cells, such as gNB 102, along with other parameters such as location estimates, and the like. The topological and other exogenous forms of data 920 includes geographic information, such as surrounding one or more of gNB 102 and gNB 103.

In block 1125, CNE 135 can apply preprocessing transformation operations, such as described herein above. In block 1130, CNE 135 partitions data in the transformed coordinates. The CNE 135 further determines whether an LoS indicator is available in block 1135.

If the CNE 135 determines that an LoS indicator is available, in block 1140, the CNE 135 partitions the data according to a LoS and nLoS. Additionally, the CNE 135 fits mixture models separately into the LoS and nLoS data in block 1145.

Instead of fitting a distribution in block 945 or block 950, a distribution is applied to calculate a log likelihood in blocks 1145 and 1150. Additionally, in block 1155, the likelihood estimates may be combined with a priori knowledge to potentially achieve greater estimation accuracy.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope.

What is claimed is:

1. An apparatus comprising:
   a processor configured to:
      in response to a first triggering event, fetch information on base station (BS) configuration parameters, the BS configuration parameters comprising at least one of: a class of a BS, a location of the BS, a height of the BS, an orientation of the BS, an antenna pattern of the BS, and topographical details surrounding the BS;
      obtain measurement reports created by at least one user equipment (UE), wherein the measurement reports comprise a signal strength value and a location of the at least one UE;
      pool the measurement reports according to the class of the BS; and
      in response to a second triggering event, periodically recalibrate one or more of a plurality of signal strength prediction tools configured to predict signal strength values for the BS; and
   a memory operably connected to the processor, the memory configured to pool and store, from a plurality of BSs, the measurement reports and corresponding BS configuration parameters, after post processing and compression.

2. The apparatus of claim 1, wherein the processor is configured to calibrate parameters of the plurality of signal strength prediction tools for each class of a plurality of classes of BS based on the measurement reports or based on additional data.

3. The apparatus of claim 2, wherein the additional data comprise one or more of: topographic information, base station height, or relative base station height.

4. The apparatus of claim 1, wherein the processor is configured to calibrate parameters of the one or more signal strength prediction tools by partitioning data in the measurement reports between line of sight (LoS) and non-line of sight (nLoS).

5. The apparatus of claim 1, wherein the processor is configured to calibrate parameters of at least one of the signal strength prediction tools based on mixture models configured to generate point, interval, or distributional estimates of the signal strength values, the mixture model comprising a Laplace mixture of topographical data and measured data.

6. The apparatus of claim 1, wherein, to obtain the measurement reports, the processor is configured to receive the measurement reports from the at least one UE based on at least one of:
   based on a key performance indicator (KPI);
   periodically, in response to expiration of a timer;
   in response to a recalibration request;
   a collection of new data exceeding a threshold; or
   an alarm indicating that newly collected data does not fit a previously calibrated prediction tool.

7. The apparatus of claim 1, wherein the processor is further configured to preprocess and compress one or more of the measured reports and corresponding BS parameters and store the compressed measured reports in the memory.

8. The apparatus of claim 1, where one or more of the measurement reports are deleted from the memory based on at least one of:
   crossing of an expiration time since a creation of the measurement reports;
   in response of a deletion request by the BS corresponding to collected data; and
   collection of new data from same BS class exceeding a threshold.

9. The apparatus of claim 1, wherein the recalibrated signal strength prediction tool is configured for:
   wireless network optimization of at least one of the BS or a second BS; or
   correction of BS configuration parameters that are error-prone of a second BS.

10. The apparatus of claim 1, wherein the processor is configured to determine an appropriate calibrated signal strength prediction tool to be used for at least one of the BS or a second BS based on the BS class, available LoS information and other available parameters of the second BS.

11. A method comprising:
    in response to a first triggering event, fetching information on base station (BS) configuration parameters, the BS configuration parameters comprising at least one of: a class of a BS, a location of the BS, a height of the BS, an orientation of the BS, an antenna pattern of the BS, and topographical details surrounding the BS;
    obtaining measurement reports created by at least one user equipment (UE), wherein the measurement reports comprise a signal strength value and a location of the at least one UE;
    pooling the measurement reports according to the class of the BS;
    in response to a second triggering event, periodically recalibrating one or more of a plurality of signal strength prediction tools, the plurality of signal strength prediction tools configured to predict received signal strength values from the BS to a plurality of locations in a vicinity of the BSs; and
    pooling and storing, in a memory, from a plurality of BSs, the measurement reports and corresponding BS configuration parameters, after post processing and compression.

12. The method of claim 11, further comprising calibrating parameters of the plurality of signal strength prediction tools for each class of a plurality of classes of BS based on the measurement reports or based on additional data.

13. The method of claim 12, wherein the additional data comprise one or more of: topographic information, base station height, or relative base station height.

14. The method of claim 11, further comprising calibrating parameters of the one or more signal strength prediction tools by partitioning data in the measurement reports between line of sight (LoS) and non-line of sight (nLoS).

15. The method of claim 11, further comprising calibrating parameters of at least one of the signal strength prediction tools based on mixture models configured to generate point, interval, or distributional estimates of the signal strength values, the mixture model comprising a Laplace mixture of topographical data and measured data.

16. The method of claim 11, wherein obtaining the measurement reports comprises receiving the measurement reports from the at least one UE based on at least one of:

based on a key performance indicator (KPI);
periodically, in response to expiration of a timer;
in response to a recalibration request;
a collection of new data exceeding a threshold; or
an alarm indicating that newly collected data does not fit a previously calibrated prediction tool.

17. The method of claim 11, further comprising preprocessing and compressing one or more of the measured reports and corresponding BS parameters and store the compressed measured reports in the memory.

18. The method of claim 11, further comprising deleting one or more of the measurement reports from the memory based on at least one of:
   crossing of an expiration time since a creation of the measurement reports;
   in response of a deletion request by the BS corresponding to collected data; and
   collection of new data from same BS class exceeding a threshold.

19. The method of claim 11, wherein the recalibrated signal strength prediction tool is configured for:
   wireless network optimization of at least one of the BS or a second BS; or
   correction of BS configuration parameters that are error-prone of a second BS.

20. The method of claim 11, further comprising determining an appropriate calibrated signal strength prediction tool to be used for at least one of the BS or a second BS based on the BS class, available LoS information and other available parameters of the second BS.

* * * * *